United States Patent [19]

Merkel

[11] 3,725,662
[45] Apr. 3, 1973

[54] INFRARED SCANNER SYSTEM HAVING INCREASED RESOLUTION AND METHOD OF USING SAME

[75] Inventor: Ronald F. Merkel, Euless, Tex.

[73] Assignee: Texas Instruments Incorporated, Dallas, Tex.

[22] Filed: Oct. 7, 1971

[21] Appl. No.: 187,245

Related U.S. Application Data

[63] Continuation-in-part of Ser. No. 86,013, Nov. 2, 1970, abandoned.

[52] U.S. Cl............................250/83.3 H, 250/83.6 S
[51] Int. Cl.................................................G01t 1/16
[58] Field of Search........250/83.3 H, 43.5 R, 83.6 S; 350/7; 356/2

[56] References Cited

UNITED STATES PATENTS

3,278,746  10/1966  Fiat..................................250/83.3 H
3,032,655  5/1962  Romans............................250/83.6 S Primary Examiner—Archie R. Borchelt
Assistant Examiner—Davis L. Willis
Attorney—James O. Dixon et al.

[57] ABSTRACT

Disclosed is an airborne optical scanning system and a method for using same wherein the resolution and velocity-to-height ratio is improved by modifying the effective field-of-view scanned by said scanning system. The scanner is rotated, preferably more than 45° from its normal axis, such that the scan lines cross the target at an angle less than 90° with the track, that is, the direction of flight, of the aircraft. The film transport portion of the system is disposed such that a modulated light beam responsive to the signal of the detector is scanned across the film along a line that forms an angle with respect to the track of the film that is identical to the angle between the track of each scan line on the target of the aircraft.

13 Claims, 8 Drawing Figures

INFRARED SCANNER SYSTEM HAVING INCREASED RESOLUTION AND METHOD OF USING SAME

This is a continuation-in-part application of parent application, Ser. No. 86,013 filed Nov. 2, 1970 and now abandoned.

This invention relates generally to an airborne detection method and system and more particularly to a method and system for optically scanning a target to detect radiation.

An optical scanning system carried in an airplane may be used to obtain strip maps of terrain over which the airplane has flown. For example, such a scanning system may include an infrared detector responsive to infrared radiation from a projected ground image of the detector as focused by an optical system. Typically the projected ground image is scanned across the terrain by rotating mirrors while an amplified detector output is recorded on film or magnetic tape. The recorded data may later be processed for correlation with numerous parameters including the speed and altitude of the airplane and the scanning rate of the mirrors to provide infrared strip maps.

The parameters of a line scanner system, that is, the velocity to height ratio, thermal resolution, spatial resolution, scan rate and signal to noise ratio, are interdependent and any one of these parameters may not be improved without sacrifice of the other parameters. The spatial and thermal resolutions are generally of prime importance for most optical line scanning systems and thus it is generally desirable to maximize these two parameters.

Most of the optical scanners presently utilized depend on rotating or oscillating optical elements to scan the field-of-view. These airborn scanners have the rotating optics oriented in such a manner that the total across track field-of-view is scanned such that the track of each scan line is at an angle of 90° with respect to the track of the aircraft (i.e., a transverse scanner). Further, the total field-of-view of these scanners is inherently a function of the design of the optical system and is not a parameter which may be readily traded off to gain increased thermal or spatial resolution. In applications such as surveying power and pipe line facilities, however, the field-of-view of conventional scanners is much greater than required while the thermal and spatial resolution and velocity to height capability are less than that required.

Accordingly, it is an object of the present invention to provide an optical scanning system having improved resolution.

A further object of the present invention is to provide a method for reducing the effective field-of-view of the optical line scanner to thereby provide for improvements in velocity to height capability and/or increased resolution.

Briefly and in accordance with the present invention, the effective total across-track field-of-view of an optical line scanner is reduced by rotating the scanner in a geometrical plane such that the field-of-view is scanned at an angle of less than 90° with the track of the aircraft. Rotating the scanner has the effect of decreasing the total across-track field-of-view of the scanner while enlarging the size of the objects on the film and increasing the rate of overscanning the target. The effective total across-track field-of-view of the scanner may be varied from a maximum which is equal to the optical field-of-view of the scanner utilized to a minimum which is the angular field-of-view of the detector utilized. A recording system is also utilized to scan the film with a modulated light source at an angle with the track of the film corresponding to the angle which the optical scanner scans the field-of-view with respect to the track of the aircraft.

The novel features believed to be characteristic of this invention are set forth in the appended claims. The invention itself, however, as well as other objects and advantages thereof may best be understood by reference to the following detailed description when read in conjunction with the accompanying drawings wherein:

Figures 1, 2:
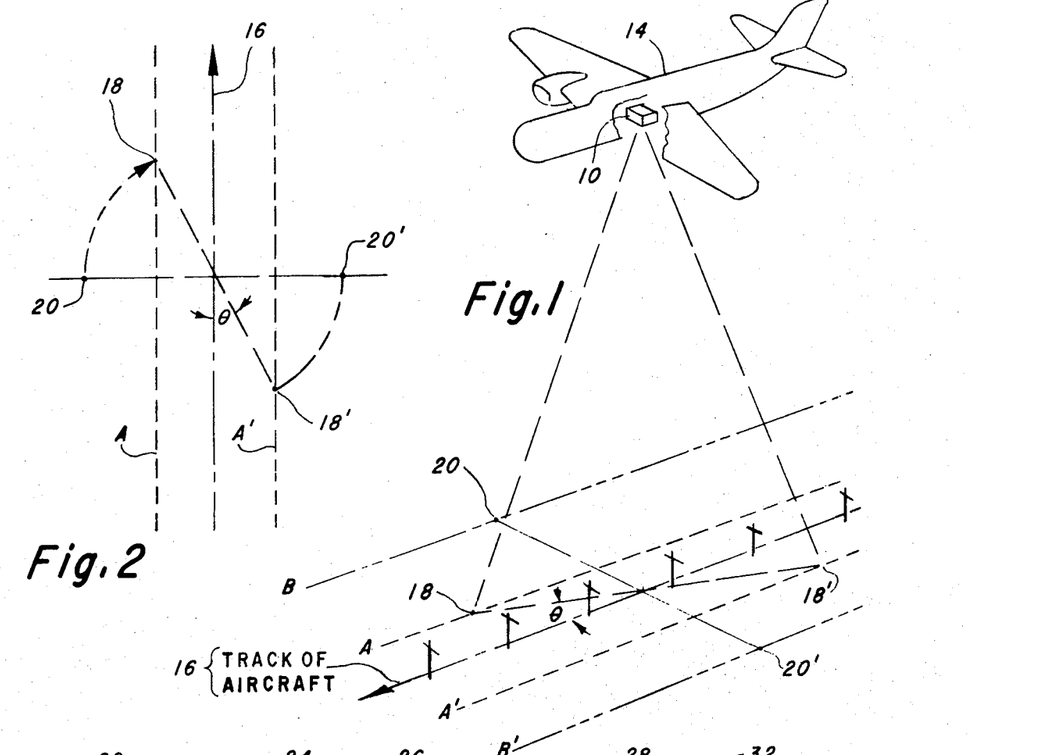
FIG. 1 is a pictorial representation depicting an aerial survey of power lines utilizing a method and optical scanning system of the present invention to increase resolution and velocity-to-height ratio capability.
FIGS. 2 and 3 depict the effect of rotating the optical scanner in accordance with the present invention with respect to the effective field-of-view.

With reference to FIG. 1, an illustrative embodiment of the present invention is depicted wherein an electrical power line is surveyed for overheated connections, localized hot spots, and other defects commonly affecting such power lines. Infrared radiation from such overheated connections, etc., may be detected and recorded by infrared scanning apparatus 10 carried in an airplane 14 flying over the power line right-of-way. The track of the airplane 14 is shown by the arrow 16. Radiation from the ground is scanned along a scan line 18—18'. As may be seen, the scan line 18—18' forms an angle θ with the track 16 of the aircraft. As the infrared scanner 10 scans successive lines of scans such as 18—18', an effective total field-of-view shown by the dashed lines A—A' is defined.

The infrared scanner 10 may be comprised of any of the line scanning systems well known in the art. Typically these line scanners which have a fixed field of view scan an area of the ground such that scan lines are perpendicular (transverse) to the track 16 of the aircraft, such as the line 20—20' shown in FIG. 1, which establishes that the fixed field of view is equal to the transverse field of view bounded by the dashed lines B—B'. As shown more particularly in FIGS. 2 and 3, the field-of-view B—B' includes a great deal of ground terrain not pertinent to the status of the power lines. By rotating the line scanner 10 about a vertical axis such that it scans a line at an angle θ to the track of the aircraft such as shown at 18—18', the effective transverse field-of-view scanned by the scanner 10 is reduced in proportion to the sine of θ with an accompanying increase in the thermal resolution and velocity to height capability of the system. This will be described in more detail with regard to the discussion of FIGS. 7 and 8.

Figures 3, 4:
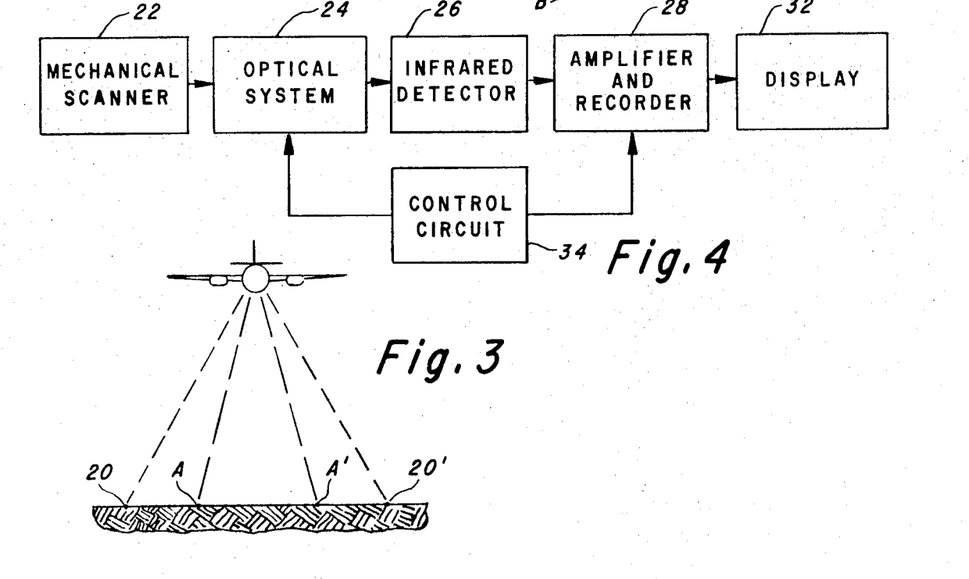
FIG. 4 is a block diagram illustrating operation of the optical scanner system of the invention.

With reference to FIG. 4, there is depicted therein the line scanner system 10 in block diagram form. In general, the infrared scanning system comprises a mechanical scanner 22 which directs radiation from along the scanning lines, such as 18—18' in FIG. 1, to an optical system 24. The optical system focuses the radiation on an infrared detector 26. It should be understood of course that the present invention applies to all optical line scanners of types which detect not only infrared but also visible and/or ultraviolet radiation. Also, in some applications it may be desirable to cool the detector by suitable means (not shown).

The detector 26 develops an electrical signal (that is, video signal) which varies as a function of the level of the radiation focused upon the detector by the optical system 24. The electrical signal developed by the detector 26 is amplified and recorded by the recorder 28. The recorder 28 may, for example, be a conventional film recorder including conventional means for converting the electrical video signal to a light modulated signal for recording on the film. It may also be a magnetic tape transport system capable of recording the electrical video signal directly. A control circuit 30 is included to synchronize the angle of rotation of the mechanical scanner 22 with the recorder 28, such that the signal recorded by the recorder 28 provides an undistorted image of the object being scanned. For example, the amplifier and recorder may comprise apparatus for converting the electrical signal into a modulated light signal to be scanned across a photosensitive film. In such an apparatus a control circuitry 30 would be operative to apply the modulated light signal to the film in synchronism with each line scan of the mechanical scanner 22 and at the same angle with respect to the track of the film that the mechanical scanner scans the terrain with respect to the track of the aircraft. Using such an arrangement the film may be viewed directly and will provide an undistorted image of the object being surveyed.

If the modulated light signal is, on the other hand, scanned at 90° with the track of the film while the field-of-view is scanned at an angle of less than 90° to the track of the aircraft, the display 32 must include rectification optics in order to provide an undistorted image of the object.

Figure 5:
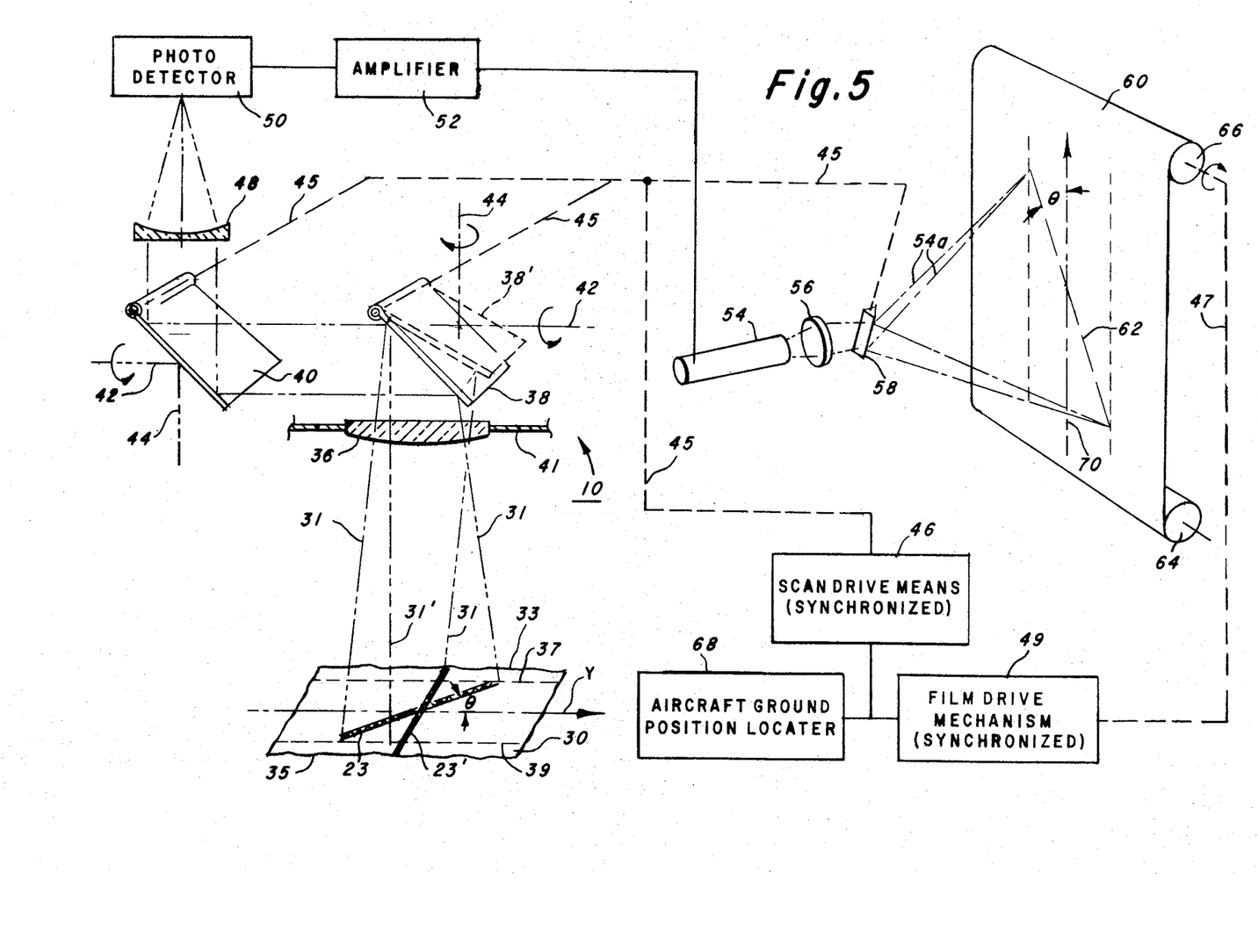
FIG. 5 is a diagrammatical illustration partly in block diagram form of one embodiment of the optical scanner of the present invention.

With respect to FIG. 5, operation of one illustrative embodiment of the present invention will be described. A portion of the terrain to be scanned is shown at 30, and the direction of flight of the aircraft is indicated by the arrow at Y. The cross-hatched area 23 indicates the portion of the terrain which is viewed during a single scan line. It is to be appreciated, of course, that the entire area 23 is not observed by the scanning system 10 at any one instance but rather successive incremental portions of the area 23 radiate along a light path 31 through a window or optical element 36 supported by the skin 41 of the aircraft 14. The area 23 of the terrain 30 that is viewed during one line scan depicts an arrangement wherein the optical scanner 10 is disposed to define a scan line forming an angle $\theta$ with respect to the track Y of the aircraft. Preferably the angle $\theta$ is in the range of 10°–20°. The cross-hatched area 23' depicts the normal arrangement wherein the optical scanner 10 forms an angle of 90° with respect to the track of the aircraft, defining an effective total across-track field-of-view bounded by the lines 33 and 35. When the optical scanner 10 is disposed so as to define scan lines shown at 23, the effective total across-track field-of-view is bounded by the lines 37 and 39.

The radiation from the terrain 30 included within the total across-track field-of-view of the optical line scanner is received by an optical system comprising first and second scanning mirrors 38 and 40 which are disposed substantially at 45° angle to the vertical, and which pivot in an oscillatory manner about a longitudinal axis 42 extending through the centers of the mirrors 38 and 40 parallel to the aircraft's line of flight. The mirrors also may be rotated about a vertical axis 44 to direct a line of scan at an angle less than 90° with respect to the flight direction of the aircraft. Oscillation and positioning of the scanning mirrors 38 and 40 is controlled by mechanical linkage indicated diagrammatically by the numeral 45 which is coupled to and driven by a scan drive mechanism 46. As may be seen, as the mirrors 38 and 40 oscillate through a small angle about the axis 42, the exciting radiation beam 31 scans back and forth across the surface of an optical element 48 which focuses the radiation on the photodetector 50. This scanning action accomplishes the desired result causing the photodetector 50 to sequentially "see" successive incremental portions of the terrain area 23.

Preferably gyroscopic mechanisms or inertial guidance mechanisms of a conventional type are provided to remove pitch, roll and yaw effects from the signal applied to the photodetector.

For illustrative purposes the mirror 38 is also shown in a position 38' indicating the position of the mirror such that the terrain 30 is scanned along a line 23' which is essentially perpendicular to the track of the aircraft.

The output signal from the photodetector 50 is applied to an amplifier 52 which may comprise any one of various known chopper amplifiers conventionally used in the photometric art. The amplified output signal is connected to a glow tube 54 which converts the video signals to an intensity modulated light beam. The light beam is focused by a conventional optical element 56. The light beam is transmitted through a prism 58 which oscillates about its vertical axis and directs the light beam onto a film strip 60.

Oscillation of the prism 58 in a synchronous manner is achieved by mechanical or electronic intercoupling to the scanning mirrors 38 and 40 as indicated diagrammatically by the dashed line 45. The synchronously rotating or oscillating prism 58 causes the focused light beam from the tube 54 to scan across the film strip 60. More specifically the beam 54a scans from left to right across the film strip 60 in synchronism with the scanning of the terrain area 23 by the photodetector 50 and its associated optical and scanning system. Accordingly, the beam 54a produces on the film 60 a space distributed image of the terrain traversed by the aircraft, with the transversely extended portion 62 of the film being an infrared picture of the terrain area 23. Vertical distribution of the picture elements of the film 60 is achieved by continuous movement of the film strip 60 vertically past the beam 54a. Specifically a roll of unexposed film 64 is provided below the plane of the beam 54a and is conveyed past the beam by means of a take-up reel 66 which is shown being driven in clockwise direction by a mechanical connection 47 to a film drive mechanism 49. The film drive mechanism is preferably controlled by an electronic synchronizing signal derived from the aircraft ground position locator 68; thus the film is driven past the light beam 54a precisely in synchronism with the rate at which the aircraft 12 traverses successive transversal, elemental portions 23 of the terrain 30. The position locator 68 may comprise any conventional locator means including Loran, Shoran, etc., or a real time clock operative to code the film to enable correlation of the film with the actual aircraft ground position.

As shown, mechanical linkage 45 connects the scan drive means 46 with the prism 58. These mechanical means are operative to direct the beam 54a transversely across the film 60 along a line 62 that forms an angle $\theta$ with respect to the line of travel 70 of the film. This ensures that the data recorded on the film 60 accurately corresponds to the object being scanned in the effective field-of-view 37 and 39 along the terrain 30. Alternately the beam 54a may be scanned across the film 60 in a line that is substantially perpendicular to line of travel 70 of the film. In such situations, the image of the object scanned is distorted. To remove this distortion, rectification optics must be utilized in the viewing apparatus used to subsequently analyze the film 60.

Figure 6:
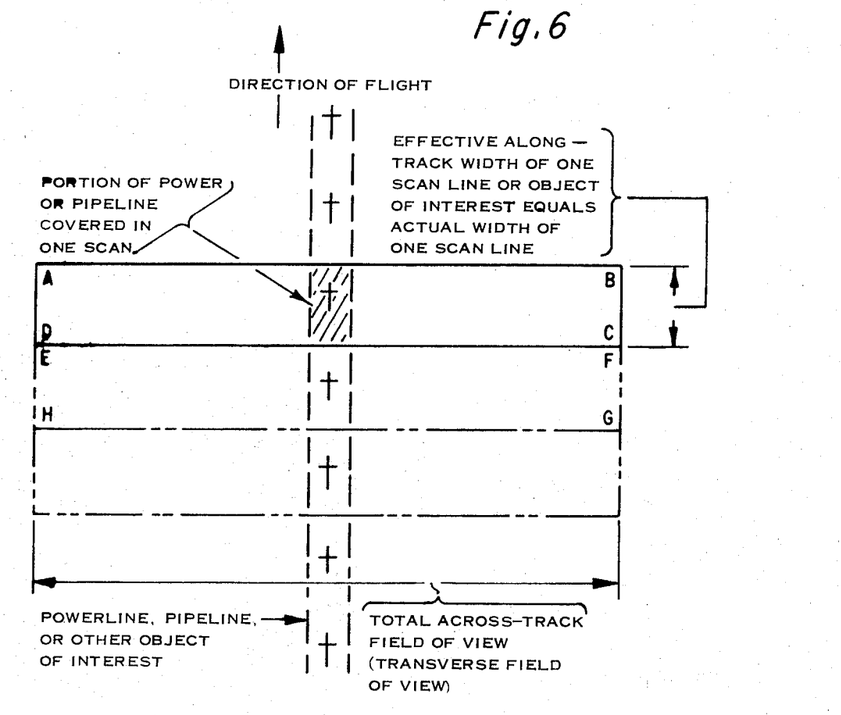
FIG. 6 is an exploded view of the field of view of a conventional transverse scanner.

FIG. 6 illustrates the transverse scanning method in which the scanning direction is 90° to the flight path. The area bounded by ABCD in FIG. 6 represents the scanned area of one scan line for a conventional transverse scanner. In actuality, the scan line ABCD in FIG. 6 is an exploded view of the scan line 23 shown in FIG. 5. In FIG. 6, for purposes of discussion, the scan rate of the optical scanner and speed and altitude of the carrying aircraft are in such a relationship that successive scans on the ground are just contiguous to one another, with no gaps and no overlapping or overscanning (i.e., scan line ABCD is contiguous with scan line EFGH, etc.). In this case it can be seen that the effective along-track width of one scan line is equal to the actual width of one scan line (BC) and the cross-track field of view is equal to the fixed field of view of the scanner. The shaded area represents the portion of the object of interest that is covered in one scan.

Figure 7:
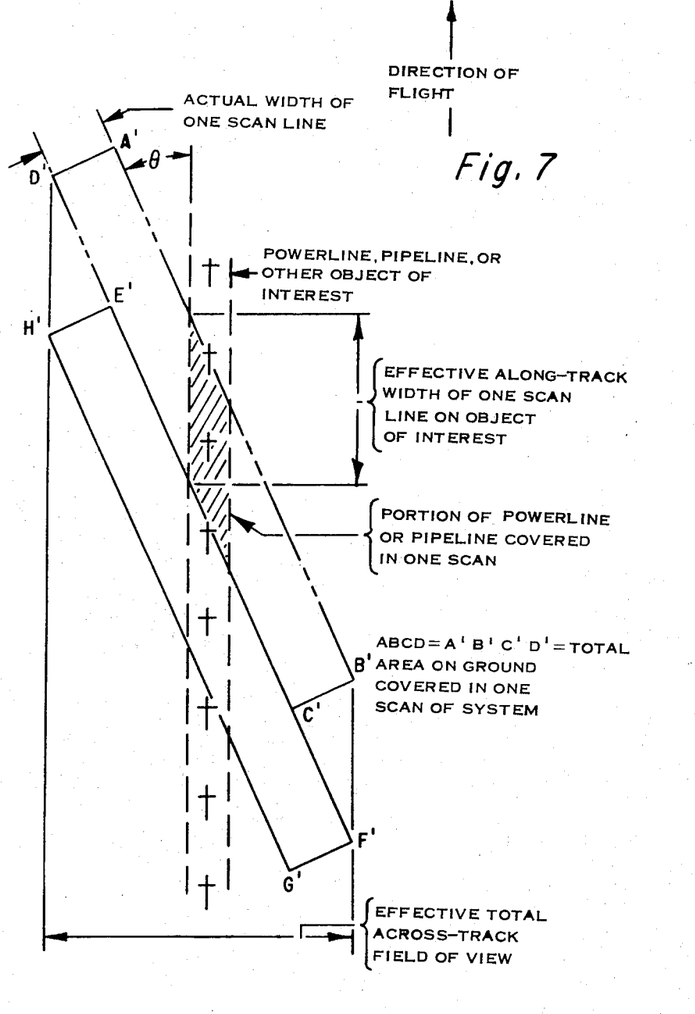
FIGS. 7 and 8 are exploded views of the scanning action according to the present invention to produce improved velocity-to-height ratio and resolution, respectively.
Figure 8:
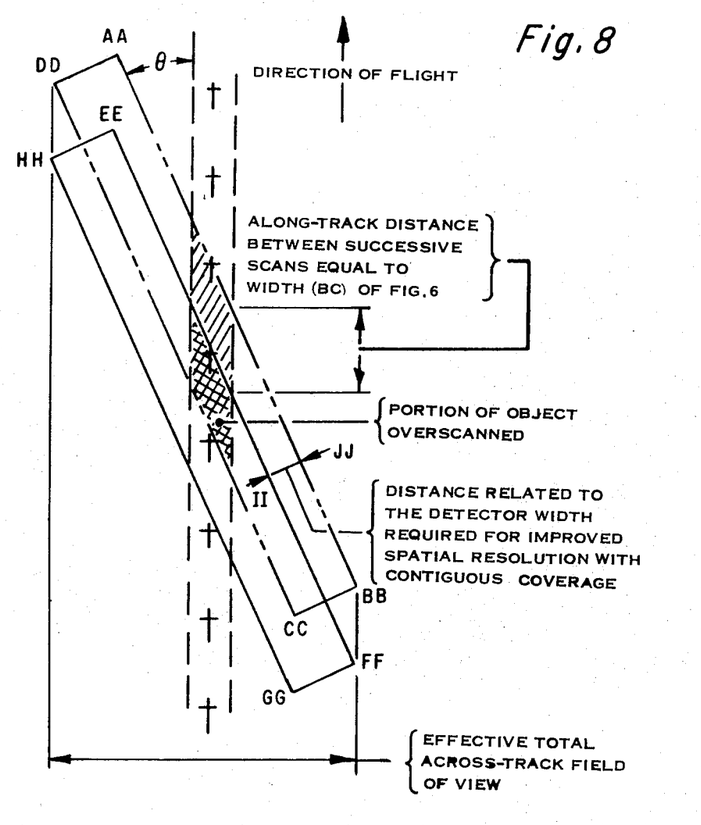

FIG. 7 represents the scanning pattern of one embodiment of the Applicant's invention in which the scanning system has been rotated about a vertical axis such that the scan direction is some angle $\theta$ (less than 90°) to the flight path. In the embodiment illustrated in FIG. 7 the scan rate and altitude and speed of the carrying aircraft are such that the scan lines are just contiguous (similar to FIG. 6). The total area on the ground covered in one scan in this embodiment, A'B'C'Φ<sup>D'</sup>, remains the same as the area ABCD in FIG. 6; however, the area is now bounded by sides which are at an angle $\theta$ (less than 90°) to the flight path and thus, as can be seen in FIG. 7, the effective across-track field of view is reduced in proportion to the sine of the angle $\theta$. Also it can be seen that the effective along-track width of one scan line has increased in proportion to the cosecant of $\theta$. Likewise, the effective along-track width of one scan line on the object of interest has increased in proportion to the cosecant of $\theta$ (it will be recognized that the actual width of the scan line illustrated in FIGS. 6–8 is extremely small in relation to the across-track width of the scan on the ground; the relative size has been exploded in FIGS. 6–8 for purposes of illustrating the concept). Since the effective along-track distance of one scan line is increased, the along-track distance covered by each scan line on the object of interest has increased. As a result the total length of the object can be completely covered with fewer scans. Thus if the scan rate in FIG. 7 is kept the same as the case illustrated in FIG. 6, for a given altitude the aircraft may fly over the object of interest faster without creating gaps in coverage of that object. The ability to maintain contiguous coverage with such an increase in velocity while holding the altitude constant shall be defined as an increase in the velocity-to-height ratio capability. Thus it can be seen that the velocity-to-height ratio increases with the cosecant of $\theta$ when all other parameters of the system are held constant.

FIG. 8 illustrates the scanning pattern similar to the embodiment illustrated in FIG. 7 in which the scanning system has been rotated about a vertical axis such that the scanning direction is at the angle $\theta$ (less than 90°) to the flight path. However, in this FIG. 8, the along-track distance between the leading edges of successive scans has been held equal to that of the embodiment in FIG. 6 in which the distance is equal to the actual width of one scan line (i.e., the along-track distance between successive scans is equal to the width BC of FIG. 6). Thus the velocity-to-height ratio at which the embodiment of FIG. 8 is operating is exactly equal to that of FIG. 6. As can be seen in FIG. 8, this arrangement and relationship of scan rate and speed and altitude of the aircraft result in considerable overlapping of successive scans, or overscanning. In such a case the overscanning causes each portion of the object of interest to be viewed more than once by the scanning system. Thus, effectively, the scanning system dwells longer on each portion of the object of interest than if the scans were exactly contiguous. Consequently, the scanning system and its detectors receive energy more than once from each portion of the terrain and other objects viewed than with a system scanning contiguous. The thermal sensitivity of an optical scanning system is generally limited by the random background noise of the detector device, and thus an increase in the coherent signal received from the terrain and other objects viewed will provide an improvement in the signal-to-noise ratio as the noise will be of a random nature. The increased signal-to-noise ratio thus provides a corresponding increase in the effective thermal sensitivity of the system with no change required in the optical design of the scanning system.

It can be seen that the amount of overscanning can be adjusted to any amount between the conditions shown in FIGS. 7 and 8 and that in all such cases both the velocity-to-height ratio capability and the thermal sensitivity will be improved over the best obtainable by a given system configured for transverse scanning as illustrated in FIG. 6.

FIG. 8 also illustrates the capability to reduce the size of the detector (not shown) to improve spatial resolution by reducing the improved velocity-to-height ratio capability and thermal sensitivity or resolution gained as a result of scanning at an angle of less than 90° to the track of the aircraft as described hereinabove. FIG. 8 illustrates the overlapping of successive scans causing each portion of the object of interest to be viewed more than once (i.e., overscanning). The velocity-to-height ratio at which the embodiment of FIG. 8 is operating is assumed equal to that of FIG. 6. FIG. 8 illustrates that the actual width of one scan line need only be the distance measured between EE–FF and AA–BB (illustrated as distance II–JJ) in order to fly over objects without creating gaps in coverage. This distance II–JJ defines the width of the detector required (not shown) to cover a scan line having a width defined by line II–JJ. The width of the detector (related to II–JJ) is less than the original detector width (which is related to the distance AA–DD). The width of the detector determines the minimum spatial resolution obtainable. Thus it can be seen that improved spatial resolution can be obtained by using a detector having a width related to the distance II–JJ less than the width of the original detector (related to the distance AA–DD) by a factor of the cosecant of the angle θ.

Flight tests were conducted using an RS7 Infrared Scanner manufactured and sold by Texas Instruments Incorporated in accordance with the present invention. The scanner was rotated to an angle of 75° such that it was scanning a field-of-view at an angle of 15° with the track of the aircraft. The effective field-of-view was decreased along the track of the aircraft and the contiguous velocity to height ratio was increased by a factor of 3.86. As understood by those skilled in the art, improvement of the velocity-to-height ratio is equatable to improvement of thermal resolution and may be traded off for improvement of spatial resolution.

The present invention provides an improved scanning system and a method for increasing the spatial and thermal resolution and velocity-to-height ratios by decreasing the effective total across-track field-of-view. This is accomplished by rotating an infrared scanner such that it scans a line that forms an angle less than 90° with respect to the track of the aircraft. Although the foregoing description relates to the preferred embodiment of the present invention, variations thereupon will be apparent to those of ordinary skill in the art without departing from the scope of the invention.

What is claimed is:

1. A method in an aircraft for scanning an area of interest to obtain improved resolution and velocity to height ratio with an optical scanning system having a fixed field of view, the transverse field of view being equal to said fixed field of view when scanning at 90° to the track of said aircraft, comprising the steps of:
   a. traversing a preselected area of interest with said aircraft; and
   b. scanning said preselected area along a scan line that forms an angle less than 90° with the track of said aircraft to thereby reduce the transverse field of view by a factor of the sine of said angle, said scanning system providing an electrical signal related to the radiation from said area of interest.

2. The method of claim 1 wherein said scanning at an angle of less than 90° is further characterized by the increase of the effective along track width covered by each scan line.

3. The method of claim 2 wherein said increase is related to said angle.

4. The method of claim 3 wherein said increase is related to the cosecant of said angle.

5. The method of claim 1 further including the step of recording and reproducing said signal to provide a reproduction thereof.

6. A scanning method as set forth in claim 5 wherein the step of recording and reproducing said electrical signal is further characterized by the steps of:
   a. producing a modulated light signal responsive to said electrical signal; and
   b. scanning said modulated light signal across the film at a preselected angle with the track of said film, said preselected angle being identical to that angle formed between said scan line and the track of said aircraft thereby producing on said film an undistorted image of said area of interest.

7. The method of claim 1 wherein said angle is in the range of 10°–20°.

8. The method as set forth in claim 5 wherein the step of recording and reproducing said signal is further characterized by the steps of:
   a. producing a modulated light signal responsive to said electrical signal;
   b. scanning said modulated light signal across a film at an angle of 90° with respect to the track of said film thereby producing on said film a distorted image of said area of interest; and
   c. projecting said distorted image through rectification optics to thereby produce an undistorted image of said area of interest.

9. The method of claim 1 wherein said area of interest is significantly narrower than the area defined by said fixed field of view of said scanner.

10. An airborne optical scanning method as set forth in claim 1 wherein said radiation is encompassed by the region of the electromagnetic wave spectrum bounded by infrared and ultraviolet radiation.

11. A method in an aircraft for scanning power, pipe line, and road facilities for radiation to obtain improved resolution and velocity to height ratio with an optical scanning system having a fixed field of view, the transverse field of view being equal to said fixed field of view when scanning at 90° to the track of said aircraft to more accurately identify defects in said facilities, comprising the steps of:
   a. traversing a preselected area containing said facilities with said aircraft;
   b. scanning said facilities along a scan line that forms an angle of less than 90° with the track of said aircraft to thereby reduce the transverse field of view by a factor of the sine of said angle which increases the along track width covered by said scan line, said detector providing an electrical signal related to the radiation from said facilities; and
   c. recording and reproducing said signal to provide a reproduction thereof.

12. The method as set forth in claim 11 wherein the step of recording and reproducing said signal is further characterized by the steps of:
   a. producing a modulated light signal responsive to said electrical signal; and b. scanning said modulated light signal across the film at a preselected angle with the track of said film, said preselected angle being identical to that angle formed between said scan line and the track of said aircraft thereby producing on said film an undistorted image of said facilities.

13. The method as set forth in claim 11 wherein the step of recording and reproducing said signal is further characterized by the steps of:

a. producing a modulated light signal responsive to said electrical signal;

b. scanning said modulated light signal across a film at 90° with respect to the track of said film thereby producing on said film a distorted image of said facilities; and c. projecting said distorted image through rectification optics to thereby product an undistorted image of said facilities.

* * * * *